United States Patent Office 2,832,790
Patented Apr. 29, 1958

2,832,790

4-NEGATIVE FUNCTIONALLY SUBSTITUTED 2,3,5-TRICHALCOGENPYRROLIDINES, THEIR SALTS, AND METHODS FOR PREPARING THEM

Edward G. Howard, Jr., Wilmington, Del., assignor to E. I. du Pont de Nemours and Company, Wilmington, Del., a corporation of Delaware No Drawing. Application September 28, 1954
Serial No. 458,961

27 Claims. (Cl. 260—326.3)

This invention relates to a new class of heterocyclic compounds and to their preparation. More specifically, this invention relates to a new class of functionally substituted pyrrolidines, to their salts and to a method for their preparation.

This application is a continuation-in-part of my copending application Serial No. 315,203, filed October 16, 1952, now abandoned.

Although the chemistry of the pyrrolidines has been rather thoroughly investigated and many interesting and valuable pyrrolidine derivatives are known, no pyrrolidine derivatives have as yet been prepared wherein all four carbons of the heterocycle are directly involved in or are directly bonded to functional groups. Some work has been carried out with pyrrolidine compounds wherein three of the ring carbons are directly involved in functional linkages, e. g., the triketopyrrolidines, or more properly the trioxopyrrolidines. However, these known compounds have attached to the fourth ring carbon only hydrogen or substituents free of functional groups, usually solely hydrocarbon radicals. Furthermore, such compounds are rather sensitive to aqueous acid, with the pyrrolidine ring under such conditions being easily broken. These compounds, although of academic interest, have thus far proved to be of no great utility.

It is an object of this invention to provide a new class of functionally substituted pyrrolidines and their salts and a method for their preparation. A further object of this invention is to provide pyrrolidines wherein all four carbons of the heterocyclic ring are directly involved in or are directly bonded to functional groups. A still further object is to provide functionally substituted pyrrolidines which are extremely stable to aqueous, strong mineral acids. Another object is to provide functionally substituted pyrrolidines which form extremely stable salts and complexes with metallic ions and thus possess outstanding characteristics as precipitants and complexing or sequestering agents for metal ions. Still another object is to provide functionaly substituted pyrrolidines and their metallic salts which have high utility as analytical reagents for metals, as metal extractants from ores, as paint additives and as pesticidal or fungicidal agents. Other objects will appear hereinafter.

The objects of this invention are accomplished by providing novel 4-substituted pyrrolidines and their salts, said 4-substituted pyrrolidines having attached to carbon in each of the 2-, 3-, and 5-positions of the heterocyclic nucleus a chalcogen of atomic number less than 17, i. e., oxygen or sulfur, having attached to the carbon atom in the 4-position of the heterocyclic nucleus a strong electron attractive group free from amino-hydrogen which, when attached to a benzene nucleus, has a positive electrostatic polarizing effect on the adjacent carbon to carbon double bond of said benzene nucleus of at least $0.84 \times 10^{-4}$ dynes, and having hydrogen attached to at least one of the atoms in the 1- and 4-positions of the heterocyclic nucleus. The classification of monovalent organic radicals with respect to their electrostatic polarizing effect on the adjacent carbon to carbon double bond of the benzene nucleus and with respect to their meta-directing effect on the benzene nucleus is given by Price, Chem. Rev. 29, 58, 1941. (See also Price, "Reactions at carbon-carbon double bonds," pp. 13–29, Interscience, 1946). This invention also includes a method for preparing these novel products.

These new compounds are thus 2,3,5-trichalcogenpyrrolidines, i. e., 2,3,5-trioxopyrrolidines, 2,3,5-trithiopyrrolidines, and 2,3,5-trioxo/thiopyrrolidines having a hydrogen atom attached to a least one of the atoms in the 1- and 4-positions of the heterocyclic nucleus and having attached to carbon in the 4-position a strong electron attractive group free from amino hydrogen, such as an acyl, carboxyl, carboxyester, cyano, carbamoyl, thiocarbamoyl or N- or N,N-mono- or di-substituted carbbamoyl or thiocarbamoyl group, or the like. In these 4-substituted pyrrolidines at least one of the two remaining free valences of the pyrrolidine ring is satisfied by hydrogen, i. e., a single valence on either the 1-nitrogen or the 4-carbon, and the other free valence is satisfied by hydrogen or by a monovalent or a divalent organic radical free of Zerewitinoff active hydrogen.

These new 4-substituted 2,3,5-trichalcogenpyrrolidines in the free acid form can be represented by the following structural formula:

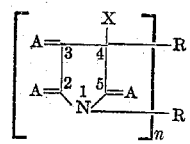

wherein $n$ is a small integer from 1 to 2; the A's are chalcogens of atomic number less than 17, i. e., oxygen or sulfur, and can be alike or different; R and R', which can be alike or different but one of which is always hydrogen, are hydrogen or monovalent or divalent organic radicals, free of Zerewitinoff active hydrogen and preferably solely hydrocarbon in nature, especially those of 1 to 18 carbons, preferably of not more than 12 carbons, and particularly those free of aliphatic unsaturation; and X is a monovalent negative, i. e., strong electron attractive, amino-hydrogen-free group which exerts when attached to a benzene nucleus a positive electrostatic polarizing effect on the adjacent carbon to carbon double bond of said benzene nucleus of at least $0.84 \times 10^{-4}$ dynes, i. e., is a strongly meta-directing group (greater than 50%).

When $n$ is 1 in the above formula, these new 4-substituted 2,3,5-trichalcogenpyrrolidines in the free acid form can be represented by the following structural formula:

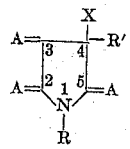

wherein the A's and X are defined as aforesaid, and R and R', which can be alike or different but one of which is always hydrogen, are hydrogen or monovalent organic radicals, free of Zerewitinoff active hydrogen and preferably solely hydrocarbon in nature, especially those of 1 to 18 carbons, preferably of not more than 12 carbons, and particularly those free of aliphatic unsaturation.

When A is oxygen the above formula is represented as follows:

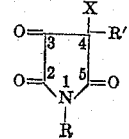

wherein X, R and R' are defined as in the preceding formula.

The most preferred 2,3,5-trichalcogenpyrrolidines of this invention are those wherein this strong electron attractive group in position 4 is an organic, monovalent, negative, functional group containing a multiple atomic linkage therein which upon hydrolysis is converted to a carboxylic acid with the formation of no additional acidic product of ionization constant greater than $1 \times 10^{-8}$. Examples of such preferred negative functional groups are the carboxyl group and groups hydrolyzable thereto with the formation of no additional acidic product of ionization constant greater than $1 \times 10^{-8}$, e. g., the cyano, carboxyester, carbamoyl, mono- and di-substituted carbamoyl, acyl, especially carbacyl groups, and the corresponding thio, thiolo, and thiono groups, e. g., the carbothiolic, carbothionic, dithiocarboxyl, thiocarbamoyl, mono- and di-substituted thiocarbamoyl groups, and the like. Preferably the A's in at least positions 2 and 3 are oxygen, and most preferably all three A's are oxygen. However, all of the A's may be sulfur or some of the A's may be sulfur and the remainder of the A's oxygen.

It should be noted, that, because of the high degree of conjugated multiple linkages as well as the known propensity for carbonyl, $>C=O$, and thiocarbonyl, $>C=S$, groups (particularly in a ring) to react as if they were in the $>C^+-O^-$ and $>C^+-S^-$ forms, the new compounds of this invention exist as equilibrium mixtures of resonance stabilized desmotropic and mesoionic forms and undergo reactions in one or more of these structures depending on conditions. These equilibrium resonance stabilized forms are illustrated, using the 4-negatively substituted 2,3,5-trioxopyrrolidines, by the following structural formulas which include the pyrroline, pyrrolenine, and pyrrolidine structures.

(a) When the 1 position is hydrogen bearing, i. e., R is H;

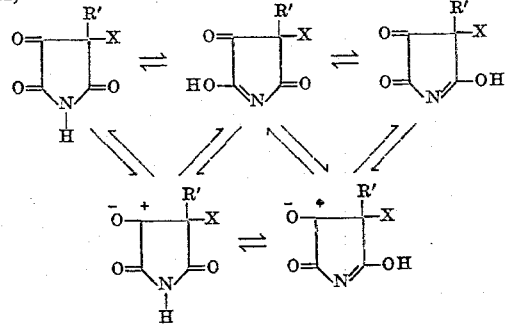

(b) When the 4 position is hydrogen bearing, i. e., R' is H;

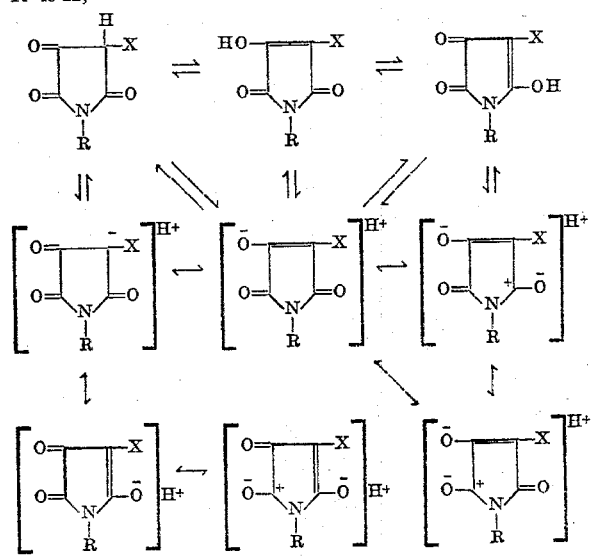

(c) When both the 1 and 4 positions are hydrogen bearing, i. e., R and R' are H;

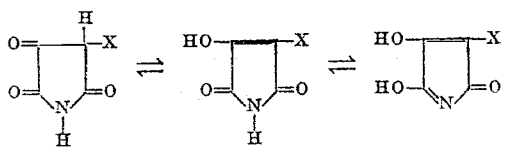

In addition, as illustrated in case (b) with the type charge separation illustrated in case (a), there also exist other mesoionic structures.

It is most convenient and it is believed most properly indicative of the properties of these new 4-negatively substituted 2,3,5-trichalcogenpyrrolidines to think of them as strong acids having the following type structures:

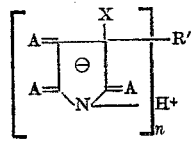

or

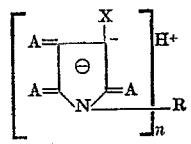

or

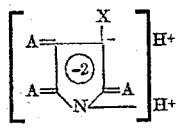

wherein R, R', n, and X are as before and the negative charges indicated for the anions are distributed around the rings and not centered in any one position. Broadly speaking, these new 4-negatively substituted 2,3,5-trichalcogenpyrrolidines can be regarded as mono- or dibasic strong acids, depending upon whether there are one or two hydrogens available in the 1- and 4-positions of the pyrrolidine nucleus. Of course, as indicated above, there are contributing resonance stabilizing forms with still higher possible charge densities in view of the charge separations possible for the various carbonyl and thiocarbonyl substituents, as well as the ring nitrogen. Generally speaking, however, the salts of these new 4-negatively substituted 2,3,5-trichalcogenpyrrolidines will usually involve one or two ionic links, as indicated in the above structures.

These various equilibrium resonance stabilized desmotropic and mesoionic structures are given for a better understanding of the nature and properties of the novel compounds of this invention and obviously in no manner are to be considered as a limitation on the scope of the present invention. Furthermore, in referring to these compounds, following conventional chemical nomenclature no attempt is made to designate the various contributing resonance structures; they will simply be referred to generically as 4-negatively substituted 2,3,5-trichalcogenpyrrolidines in which the monovalent negative group is as defined above and in which the chalcogens are of atomic number less than 17. This includes the 4-negatively substituted 2,3,5-trioxopyrrolidines, the 4-negatively substituted 2,3,5-trithiopyrrolidines, and the 4-negatively substituted 2,3,5-trioxo/thiopyrrolidines and ionically linked ammonium, including substituted ammonium, and metal salts thereof, including expressly the salts of metals of groups I–VIII of the periodic table as well as the subgroups thereof.

These new 4-negatively substituted 2,3,5-trichalcogenpyrrolidines are water-soluble, crystalline solids of relatively high melting point, generally characterized by a yellow to orange or red coloration, which behave in aqueous systems like strong acids of $pK_a=2.0$–$3.0$. Generically, they exhibit a characterisic ultraviolet absorption curve with a major absorption peak in the range 2300–2700 A., particularly in the range 2340–2680 A. under acid, neutral, and basic conditions and, generally, under acidic and neutral conditions, a secondary absorption peak in the 3400–3700 A. region, particularly in the 3420–3670 A. region. Generically, they also exhibit an infrared absorption curve with a weak band in the $5.6\mu$ region and a strong band in the $5.8\mu$ region.

A particularly outstanding characteristic of this new class of 4-functionally substituted 2,3,5-trichalcogenpyrrolidines is their ability to form salts and complexes with metallic irons. These salts can be mono- or polybasic depending upon the formal valence of the metal, the number of 2,3,5-trichalcogenpyrrolidine nuclei, and the number of acidic hydrogens available on the 4-carbon, the 1-nitrogen of each trichalcogenpyrrolidine nuclei, and the functional group in each 4-position thereof. The alkali metal salts, e. g., the disodium salts, of the compounds wherein there is one hydrogen available on both the 1- and 4-positions of the trichalcogenpyrrolidine ring are usually obtained as such directly from the preparative mixture when two moles or more of the strong alkaline condensing agent are used. These dialkali metal salts can be readily recrystallized and simultaneously converted to the monoalkali metal salts by simple treatment with aqueous, strong mineral acids of $pK_a$ less than 2, e. g., 5% aqueous hydrochloric acid. The monoalkali or dialkali metal salts of the mono- or bis-compounds corresponding to the above structures, wherein only one hydrogen is available in either the 1- or 4-position of the pyrrolidine ring or rings are similarly obtained. They too can be readily recrystallized from the above class of aqueous strong mineral acids, but being weaker acids lose the single ionically bonded metal atom and thus are converted to the free acid form.

By simple methasesis of these alkali metal salts with soluble salts of the metals of groups II–VIII, including the subgroups, of the periodic table the heavier metal salts of the 4-negatively substituted 2,3,5-trichalcogenpyrrolidines are obtained directly, generally as insoluble, deeply colored, stable solids. The metal salts, including the alkali metal salts, of the 4-negatively substituted 2,3,5-trioxopyrrolidines which have two hydrogens available in the 1- and 4-positions of each pyrrolidine ring or rings are extremely stable to strong aqueous acid, e. g., acids of $pK_a$ less than about 1, such as sulfuric and hydrochloric acids, and the like, even in concentrations as high as 25% by weight, and can be recrystallized unchanged from such acids, i. e., the metal remains ionically bonded to the pyrrolidine nucleus. Thus, these compounds, especially those having a hydrogen available in both the 1- and 4-positions of the pyrrolidine ring possess outstanding characteristics as precipitants and complexing or sequestering agents for metal ions, for instance, and as lead sequestering agents. Certain of these new compounds also exhibit interesting physiological activity, for instance, as pesticides or fungicides, or both.

These new 4-functionally substituted 2,3,5-trichalcogenpyrrolidines can be easily and conveniently prepared in high yields by the direct condensation in the presence of a strong base between oxalate esters, or the analogous thiolo, thiono, or dithiooxalate esters, and amides of carboxylic, carbothiolic, thionocarboxylic, and dithiocarboxylic acids of at least two carbons having a total of at least three hydrogens on amide nitrogen and the carbon of the acid skeleton alpha to the said amido hydrogen-bearing carboxamide or thionocarboxamide group and, in addition, directly bonded to said alpha carbon a monovalent strong electron attractive, amino-hydrogen-free group which exerts when attached to a benzene nucleus a positive electrostatic polarizing effect on the adjacent carbon-carbon double bond of said benzene nucleus of at least $0.84 \times 10^{-4}$ dynes, i. e., is strongly meta-directing (greater than 50%), which negative functional group is preferably carboxyl or a group hydrolyzable to a carboxylic acid with the liberation of no additional acidic group of ionization constant greater than $1 \times 10^{-8}$.

This condensation is normally carried out at temperatures in the range 20 to 150° C. or higher, and most preferably in the range 25 to 60° C., under anhydrous conditions using a normally liquid, unreactive organic reaction medium.

The base can be any one or more of the extremely strong bases suitable for use in the Claisen condensation and is present in the reaction zone in at least equimolar proportions based on each of the reactants, i. e., at least one mole of base will be present for each mole of the 4-negatively substituted 2,3,5-trichalcogenpyrrolidine to be formed. Suitable examples of this class of organic-soluble, extremely strong bases include the alkali metal and the alkaline earth metal alcoholates, e. g., the alkoxides such as sodium propoxide; the hydrocarbometallic compounds and complexes, e. g., the alkali metal and alkaline earth metal hydrocarbo-compounds and complexes, such as the alkyls, aryls, alkaryls, and aralkyls, including complexes with the poly-nuclear hydrocarbons, suitable examples of which include sodiummethyl, lithiumphenyl, calciumbenzyl and the sodium anthracene complex; metal hydrides, particularly the alkali metal and alkaline earth metal hydrides, e. g., sodium hydride, calcium hydride; the metal amides, particularly the alkali metal and alkaline earth metal amides, such as sodamide; and the like. Because of their efficiency in the condensation reaction, the alkali metal alkoxides are normally used. For covenience, these alkali metal alkoxides are generated, in situ, from the corresponding alkali metal and an alkyl alcohol, the latter being conveniently used in excess to serve as the organic reaction medium.

The oxalate and the various analogous sulfur substituted oxalate esters, generically referred to as the thiooxalate esters, can be those of any of the monovalent alcohols or phenols with oxalic or thiolo-, thiono-, and dithiooxalic acids and, for reasons of greater availability, are normally the symmetrical oxalate esters of the primary lower aliphatic monoalcohols or monophenols of normally no more than seven carbons, e. g., dihexyl, o-, m-, or p-ditolyl, diphenyl, dipropyl oxalates; dimethyl, diisopropyl, dithionooxalates; diethyl tetrathiooxalate; and the like. Thus, the preferred oxalate and thiooxalate esters contain up to 16 carbon atoms. Depending on whether one or both of the carbonyl oxygens are replaced by sulfur, one or both of the substituents on the 2- and 3-carbons of the 2,3,5-trioxo/thiopyrrolidines will be sulfur.

The alpha-negative functionally substituted primary and secondary amides of carboxylic and thionocarboxylic acids of at least two carbons which are used as the other reactant in the condensation can be conveniently described by the following structural formula

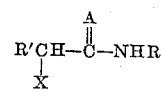

wherein A is a chalcogen of atomic number less than 17, i. e., oxygen or sulfur, R and R', which can be alike or different but one of which is always hydrogen, are hydrogen or monovalent or divalent organic radicals, free of Zerewitinoff active hydrogen and preferably solely hydrocarbon in nature, especially those of not more than 18 carbon atoms and particularly those of no more than twelve carbons each, and particularly those free of aliphatic unsaturation; and X, as above, is a monovalent strong electron attractive, amino-hydrogen-free group which exerts when attached to a benzene nucleus a positive electrostatic polarizing effect on the adjacent carbon-carbon double bond of said benzene nucleus of at least $0.84 \times 10^{-4}$ dynes, i. e., is a strongly meta-directing group (greater than 50%). The most preferred 2,3,5-trichalcogenpyrrolidines of this invention are those wherein this strong electron attractive group in position 4 is an organic, monovalent negative functional group containing a multiple atomic linkage therein which upon hydrolysis is converted to a carboxylic acid with the formation of no additional acidic product of ionization constant greater than $1 \times 10^{-8}$, particularly carboxyl or o group hydrolyzable thereto with liberation of no additional acidic group of ionization constant greater than $1 \times 10^{-8}$.

The reaction between the oxalic ester and the alpha-negative functional substituted amide can be represented schematically as follows wherein A' is a chalcogen of atomic number less than 17, R'' is generally a hydrocarbon radical, and the A's, X, R and R' are defined as aforesaid:

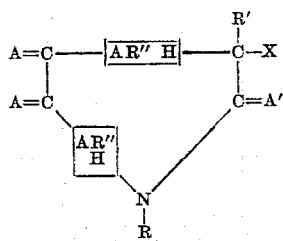

In the resulting new 2,3,5-trichalcogenpyrrolidines, R' will be the substituent on the 4-carbon, R will be the substituent on the ring nitrogen, i. e., on position 1 of the ring, X will be the negative functional group on the 4-carbon of the ring, and A' will be the substituent on the 5-carbon.

The particular oxalate ester used is not at all critical since neither of the AR'', i. e., R''O— or R''S— radicals, which can be alike or different, of either of the ester R''OCO— or thioloester R''SCO— groups, as is also true of the other useable derivatives, appears in the resulting product, i. e., the only portion of the oxalic or thiooxalic acid derivative appearing in the resulting product is the —CO—CO— unit or the corresponding sulfur, i. e., thiono or dithiono, substituted units. Generally, because of greater availability oxalate esters are employed wherein R'' is a hydrocarbon radical of not more than 7 carbons.

In those instances where either R or R' or both are divalent, i. e., using the alpha,omega-dinegatively substituted alpha,omega-dicarbacyl amides or the bis(N,N'-di-alpha-negatively substituted carbacylamides), the corresponding bis[2,3,5-trichalcogenpyrrolidines] are obtained linked through, respectively, the 4- and 1-positions. Thus, with

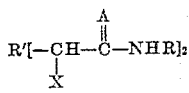

the products are the 4,4'-bis[2,3,5-trichalcogenpyrrolidines] of the structure

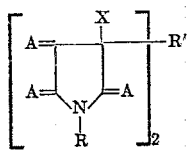

and with

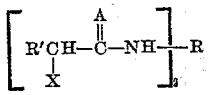

the products are the 1,1'-bis[2,3,5-trichalcogenpyrrolidines] of the structure

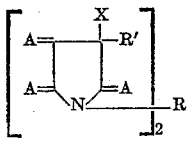

wherein the A's, R, R' and X are as aforesaid.

Suitable examples of this preferred group of negative radicals indicated by X in the above formulas include: the carboxamide and thiocarboxamide radicals, including carbamoyl, thiocarbamoyl, and N-mono- and N,N-disubstituted carbamoyl and thiocarbamoyl, i. e., the primary, secondary, and tertiary carbamoyl and thiocarbamoyl radicals, preferably those wherein the N-substituents, if any, are of no more than twelve carbons each, particularly hydrocarbon and halohydrocarbon; the carboxyl and thiocarboxyl, including both thiono-, thiolo- and dithiocarboxyl radicals; the corresponding carboxy and thiono, thiolo- and dithiocarboxy ester radicals, including those of the monovalent, solely hydrocarbon primary, secondary and tertiary alcohols, thiols, and the corresponding phenols and thiophenols and preferably the alcohols, thiols, phenols, and thiophenols of no more than seven carbons; the acyl radicals, preferably those of carboxylic, thiolocarboxylic, thionocarboxylic, and dithiocarboxylic acids of no more than seven carbons each; the nitrile radical; and the like. Because of their ready availability and high reaction efficiency, the malonamides, such as malonamide, N,N'-diethylmalonamide and the like, represent a particularly outstanding class of these alpha-hydrogen-bearing, alpha-negatively substituted N-hydrogen-bearing acetamides and alpha-hydrocarbon substituted acetamides.

This invention is described in greater detail in the following examples which are illustrative but not restrictive of the invention. The parts are by weight unless otherwise specified.

EXAMPLE I

*Part A.—4-carbamoyl-2,3,5-trioxopyrrolidine and its monosodium salt*

To a stirred, refluxing methanol solution of sodium methoxide (2.3 parts of metallic sodium in about 79 parts of absolute methanol) was added over a period of 1.5 hours, alternately and in small portions, a solution of 11.8 parts of dimethyl oxalate in about 79 parts of absolute methanol and 10.2 parts of solid pulverized malonamide (both in equimolar proportions based on the sodium methoxide) while maintaining the solution at the reflux. The reaction mixture was allowed to stand overnight and the solid material then removed by filtration and subsequently extracted exhaustively with absolute ethyl alcohol. As the ethyl alcohol insoluble material, there was obtained 5.5 parts (67% yield and 31% conversion) of the monosodium salt of 4-carbamoyl-2,3,5-trioxopyrrolidine as a water-soluble, yellow solid, exhibiting in water solution with ferric chloride a deep red coloration and with copper sulfate solution forming a pale blue copper salt. Upon recrystallization from water and drying at 100° C. under reduced pressure, the pure monosodium salt of 4-carbamoyl-2,3,5-trioxopyrrolidine was obtained as yellow-orange crystals.

*Analysis.*—Calc'd for $C_5H_3N_2O_4Na$: N, 15.7%. Found: N, 15.5%.

As is true of these new 2,3,5-trichalcogenpyrrolidines carrying a negative substituent in the 4-position and having hydrogen on both the 1- and 4-positions, this sodium salt is extremely stable and can be recrystallized readily from hot 25–28% aqueous solutions of sulfuric acid.

Upon direct passage of a solution of 2 parts of the above monosodium salt in 400 parts of water through a 10-inch vertical column packed with a commercial acid ion exchange resin at the rate of 1 drop ever two seconds and evaporation of the water from the strongly acidic effluent at 20–25° C. under reduced pressure, there was thus obtained 1.09 parts of the crude, free trioxopyrrolidine as a light yellow solid. After rapid recrystallization from water, the pure 4-carbamoyl-2,3,5-trioxopyrrolidine was obtained as light yellow crystals, melting at 230–235° C. with decomposition and exhibiting a $pK_a$ of 2.8 (see Ingold, Chimia 5, 196, 1951).

*Analysis.*—Calc'd for $C_5H_4N_2O_4$: C, 38.5%; H, 2.6%. Found: C, 38.5%; H, 2.8%.

As further characterization, the above 4-carbamoyl-2,3,5-trioxopyrrolidine was treated with 2,4-dinitrophenylhydrazine hydrochloride in the manner of Shriner and Fuson, "The Systematic Identification of Organic Compounds," 2nd ed., p. 143, John Wiley (1940). The resulting precipitate of the 2,4-dinitrophenylhydrazone of 4-carbamoyl-2,3,5-trioxopyrrolidine after isolation and drying gave the following results on analysis:

*Analysis.*—Calc'd for $C_{11}H_8N_6O_7$: C, 39.3%; H, 2.4%. Found: C, 39.3%; H, 2.6%.

with water, and finally dried overnight in a vacuum desiccator at room temperature over anhydrous calcium chloride. There was thus obtained 1.74 parts of the ferrous-bis[4-carbamoyl-2,3,5-trioxopyrrolidine]tetrahydrate salt as a red-brown amorphous solid.

*Analysis.*—Calc'd for $(C_5H_3N_2O_4)_2Fe.4H_2O$: C, 27.4%; H, 3.2%; N, 12.8%; Fe, 12.7%. Found: C, 27.5%; H, 3.2%; N, 12.8%, 12.9%; Fe, 12.7%.

A 1.0457 parts sample of the above tetrahydrate was maintained at 152° C. for 16 hours in a drying pistol at a pressure corresponding to 0.1–0.5 mm. of mercury, using anhydrous phosphorus pentoxide as the drying agent. During this period, the sample lightened appreciably in color and after drying was found to have lost almost exactly the theoretical amount corresponding to four moles of water.

Calc'd weight for loss of four moles of water: 0.8738 part. Found: 0.8732 part.

The data obtained in similar preparations of other metal salts of 4-carbamoyl-2,3,5-trioxopyrrolidine are summarized in the following table.

TABLE I.—METAL SALTS OF 4-CARBAMOYL-2,3,5-TRIOXOPYRROLIDINE

| Salt | Formula | | Analysis | | | |
| --- | --- | --- | --- | --- | --- | --- |
| | | | Percent C | Percent H | Percent N | Metal, Percent |
| Ferric-tris Dihydrate | $(C_5H_3N_2O_4)_3Fe.2H_2O$ | Calc'd | 32.3 | 2.4 | 15.1 | Fe, 10.0. |
| | | Found | 32.1 | 2.6 | 15.0 | Fe, 10.4. |
| Cupric-bis Monohydrate | $(C_5H_3N_2O_4)_2Cu.H_2O$ | Calc'd | | | 14.3 | Cu, 16.2. |
| | | Found | | | 14.4 | Cu, 16.1. |
| Silver Anhydrous | $C_5H_3N_2O_4Ag$ | Calc'd | 22.8 | 1.2 | 10.6 | Ag, 41.0. |
| | | Found | 22.4 | 1.6 | 10.4 | Ag, 39.7. |
| Barium-bis Trihydrate | $(C_5H_3N_2O_4)_2Ba.3H_2O$ | Calc'd | 24.0 | 2.4 | 11.2 | |
| | | Found | 23.5 | 2.2 | 11.8 | |
| Manganous-bis Dihydrate | $(C_5H_3N_2O_4)_2Mn.2H_2O$ | Calc'd | 30.0 | 2.5 | 14.0 | Mn, 13.7. |
| | | Found | 30.1 | 2.8 | 13.7 | Mn, 13.4. |
| Cobaltous-bis Tetrahydrate | $(C_5H_3N_2O_4)_2Co.4H_2O$ | Calc'd | 27.2 | 3.2 | 12.7 | Co, 13.3. |
| | | Found | 27.2 | 3.3 | 12.6 | Co, 13.4. |
| Nickelous-bis Tetrahydrate | $(C_5H_3N_2O_4)_2Ni.4H_2O$ | Calc'd | 27.2 | 3.2 | 12.7 | Ni, 13.3. |
| | | Found | 27.2 | 3.3 | 12.7 | Ni, 12.8. |
| Stannous-bis Anhydrous | $(C_5H_3N_2O_4)_2Sn$ | Calc'd | 28.0 | 1.4 | 13.1 | |
| | | Found | 28.4 | 1.8 | 12.9 | |
| Plumbous-bis Anhydrous | $(C_5H_3N_2O_4)_2Pb$ | Calc'd | 23.2 | 1.2 | 10.8 | Pb, 40.0. |
| | | Found | 23.4 | 1.4 | 10.6 | Pb, 40.6. |
| Aluminum-tris Trihydrate | $(C_5H_3N_2O_4)_3Al.3H_2O$ | Calc'd | 33.0 | 2.8 | 15.4 | Al, 4.9. |
| | | Found | 33.4 | 2.8 | 15.5 | Al, 5.7. |

*Part B.*—The disodium salt of 4-carbamoyl-2,3,5-trioxopyrrolidine

Similar experiments carried out utilizing two molar proportions of sodium based on the malonamide and oxalate ester resulted in the preparation in yields as high as 74% of theory of the yellow disodium salt of 4-carbamoyl-2,3,5-trioxopyrrolidine isolated as the methanolate, which is similar in properties to the above described monosodium salt. This salt is of special interest in that it exhibits specific activity against *Candida albicans*. The alkali metal salts of Parts A and B are also useful as fungicides, particularly as intermediates for the formation of the more insoluble and more active fungicidal, heavy metal salts, e. g., the copper salts which are readily obtained as pale, blue solids by the addition of an aqueous acidic solution of the sodium salt to aqueous copper sulfate solution.

*Part C.*—Other metal salts of 4-carbamoyl-2,3,5-trioxopyrrolidine the ferrous-bis tetrahydrate salt To a freshly filtered hot solution of 1.96 parts of the above monosodium salt of 4-carbamoyl-2,3,5-trioxopyrrolidine in 60 parts of water was added, dropwise with stirring at steam bath temperatures, a filtered solution of 1.5 parts (0.5 molar proportion based on the sodium salt) of ferrous sulfate heptahydrate in 10 parts of water. A dark reddish brown precipitate formed immediately. The reaction mixture was allowed to cool to room temperature and the solid was removed by filtration, washed

EXAMPLE II

*1-methyl-4-(N-methylcarbamoyl)-2,3,5-trioxyopyrrolidine and the monohydrated monosodium salt thereof*

To a stirred, refluxing ethanol solution of sodium ethoxide (4.6 parts of sodium in about 198 parts of absolute ethyl alcohol) was added 13.0 parts of N,N'-dimethylmalonamide (0.5 molar proportion based on the sodium ethylate). To the resulting clear solution was added immediately and in one portion a solution of 7.8 parts (an equimolar proportion based on the malonamide) of dimethyl oxalate in about 80 parts of absolute ethyl alcohol. A pale, yellow, powdery precipitate formed which was collected by filtration, washed with alcohol, and dried.

There was thus obtained 19 parts of the crude sodium salt of 1-methyl-4-(N-methylcarbamoyl)-2,3,5-trioxopyrrolidine. After recrystallization from water, the pure monohydrated monosodium salt was obtained as a yellow, feathery, crystalline solid melting at 184–188° C. and with increasing temperature solidifying at about 195° C. and finally remelting at 240° C.

*Analysis.*—Calc'd for $C_7H_7N_2O_4Na.H_2O$: C, 37.5%; H, 4.0%; N, 12.5%; Na, 10.4%. Found: C, 37.5%; H, 4.1%; N, 12.2%; Na, 10.3%.

A water solution of this new product gave insoluble salts with calcium, barium, zinc, copper, and lead ions. The sodium salt exhibited cathodoluminescence in the green-yellow region. The monohydrated monosodium salt of 1-methyl-4-(N-methylcarbamoyl)-2,3,5-trioxopyrrolidine was further characterized by the formation, as above, of the 2,4-dinitrophenylhydrazone as red, thread-like crystals melting at 240° C. with decomposition.

*Analysis.*—Calc'd for $C_{13}H_{12}N_6O_7$: C, 42.9%; H, 3.3%; N, 23.1%. Found: C, 43.0%; H, 3.4%; N, 22.9%.

Upon recrystallization of the monohydrated monosodium salt from aqueous 5% hydrochloric acid and subsequent recrystallization from ethyl alcohol, the free acid, 1 - methyl - 4 - (N - methylcarbamoyl) - 2,3,5 - trioxopyrrolidine, was obtained as yellow, glistening plates melting at 215° C. with decomposition.

*Analysis.*—Calc'd for $C_7H_8N_2O_4$: C, 45.6%; H, 4.4%; N, 15.2%. Found: C, 45.5%; H, 4.3%; N, 14.8%, 14.7%.

EXAMPLE III

*Part A.—The reactant N, N'-diallylmalonamide*

A mixture of 160 parts of diethyl malonate and 200 parts of allylamine (3.5 molar proportions based on the diethyl malonate) was heated at the reflux for 12 hours and the reaction mixture then cooled in an ice/water bath. The solid product thereby formed was removed from the reaction mixture by filtration. After drying there was thus obtained 165 parts (91% of theory) of crude N,N'-diallylmalonamide. After recrystallization from 2-B alcohol, the product was obtained as white crystals melting at 144–145° C.

*Analysis.*—Calc'd for $C_9H_{14}N_2O_2$: N, 15.4%. Found: N, 15.4%.

*Part B.—1-allyl-4-(N-allylcarbamoyl)-2,3,5-trioxopyrrolidine and salts thereof*

To a hot (63° C.) methanol solution of sodium methoxide (26.6 parts of sodium in about 320 parts of absolute methyl alcohol) was added with stirring 105 parts of the above N,N'-diallylmalonamide (0.50 molar proportion based on the sodium methoxide) followed immediately by a solution of 68 parts (an equimolar proportion based on the N,N'-diallylmalonamide) of dimethyl oxalate in about 160 parts of absolute methyl alcohol. The resulting reaction mixture was heated at 63–68° C. for 30 minutes, allowed to cool slowly to room temperature, and finally cooled in an ice/water bath. The solid was removed by filtration and dried. There was thus obtained 125 parts of the crude sodium salt of 1-allyl-4-(N-allylcarbamoyl)-2,3,5-trioxopyrrolidine as a pale yellow, crystalline solid. A solution of 50 parts of this sodium salt in 200 parts of ice water was acidified immediately to a pH of about 1.0 by the addition of cold, aqueous 50% sulfuric acid. The resulting solid was removed by filtration and dried under reduced pressure. After recrystallization from anhydrous diethyl ether, there was obtained 28 parts, representing an overall 52% yield, of the pure free acid, 1-allyl-4-(N-allylcarbamoyl)-2,3,5-trioxopyrrolidine, as a pale yellow crystalline solid melting at 98–100° C.

*Analysis.*—Calc'd for $C_{11}H_{12}N_2O_4$: C, 55.8%; H, 5.1%; N, 11.9%. Found: C, 55.4%; H, 5.0%; N, 12.1%.

The 1-allyl-4-(N-allylcarbamoyl)-2,3,5 - trioxopyrrolidine was soluble in water, ether, benzene, alcohol, etc. and formed insoluble salts with such metal ions as silver, plumbous, mercuric, cupric, cadmium, zinc, calcium, barium, cobalt, nickel, and ferric ions. The cupric salt exhibited good fungicidal activity, in particular against tomato blight.

EXAMPLE IV

*The monosodium salt of 4-allyl-4-carbamoyl-2,3,5-trioxopyrrolidine*

To a stirred, heated solution of sodium methoxide in absolute methanol (4.6 parts of sodium in about 170 parts of absolute methyl alcohol) was added 13.2 parts of C-allyl malonamide (0.5 molar proportion based on the sodium methoxide) followed immediately by a solution of 11.8 parts (an equimolar proportion based on the C-allylmalonamide) of dimethyl oxalate in about 80 parts of absolute methyl alcohol. The reaction mixture turned yellow and a small amount of solid material was formed. The reaction mixture was stirred and heated at the reflux for one-half hour, then cooled, and the solid material removed by filtration. On standing a bright, yellow solid formed in the filtrate and was subsequently removed by filtration. There was thus obtained 6 parts of the monosodium salt of 4-allyl-4-carbamoyl-2,3,5-trioxopyrrolidine as a bright, yellow solid exhibiting a characteristic ultraviolet absorption curve for the 4-negatively substituted trichalcogenpyrrolidines.

EXAMPLE V

*4-cyano-2,3,5-trioxopyrrolidine and the monohydrated monosodium salt thereof*

To a stirred solution of sodium ethoxide in absolute ethanol (13.8 parts of sodium in about 320 parts of absolute ethanol) was added in one portion 25.2 parts of cyanoacetamide (0.5 molar proportion based on the sodium ethoxide) followed immediately by 46.8 parts (an equimolar proportion based on the cyanoacetamide) of diethyl oxalate in about 80 parts of absolute ethanol. The reaction mixture was heated at 65° C. for 10 minutes and the solid product removed by filtration. There was thus obtained 52 parts of mixed mono- and disodium salts of 4-cyano-2,3,5-trioxopyrrolidine as a water-soluble, yellow crystalline solid which, like the other trichalcogenpyrrolidines of this invention, formed insoluble metal salts with aqueous solutions containing copper, lead, and silver ions and exhibited a red color with ferric chloride solution and a similar ultraviolet absorption spectrum.

Upon recrystallization of the above mixed sodium salts from 5% aqueous hydrochloric acid there was obtained, after drying at 65° C. for 5 hours, the pure monosodium, monohydrated salt of 4-cyano-2,3,5-trioxopyrrolidine as a light yellow, amorphous powder, decomposing over 300° C. with no sharp melting point.

*Analysis.*—Calc'd for $C_5HN_2O_3Na \cdot H_2O$: N, 15.7%. Found: N, 15.6%.

A water solution of the free acid, i. e., 4-cyano-2,3,5-trioxopyrrolidine, was obtained by passing an aqueous solution of the above monohydrated, monosodium salt through a column packed with an acid ion exchange resin.

EXAMPLE VI

*4-carboethoxy (i. e., 4-ethoxycarbonyl)-2,3,5-trioxopyrrolidine and its monohydrated sodium salts*

To a stirred ethanol solution of sodium ethoxide (7 parts of sodium in about 160 parts of absolute ethanol) was added at room temperature 20 parts of ethyl malonamate (0.50 molar proportion based on the sodium ethoxide) and 20.4 parts of diethyl oxalate (an equimolar proportion based on the malonamate). A bright yellow solid formed immediately in the reaction mixture and was removed directly by filtration. After washing with 160 parts of absolute ethanol and drying, there was obtained 31.7 parts of mixed mono- and disodium salts of 4-carboethoxy-2,3,5-trioxopyrrolidine as an amorphous yellow solid. After two rapid recrystallizations from aqueous 5% hydrochloric acid, the pure monosodium salt of 4-carboethoxy-2,3,5-trioxopyrrolidine (alternatively 4-ethoxycarbonyl-2,3,5-trioxopyrrolidine) was obtained in the form of its monohydrate as a light yellow, amorphous powder.

*Analysis.*—Calc'd for $C_7H_6NO_5Na \cdot H_2O$: N, 6.2%. Found: N, 6.4%.

The free 4-carboethoxy (or, alternatively, 4-ethoxycarbonyl)-2,3,5-trioxopyrrolidine was obtained conveniently as a very water-soluble, light yellow, crystalline solid by passage of an aqueous solution of the above monohydrated monosodium salt through a column packed with a commercial acid ion exchange resin followed by evaporation of the water from the aqueous effluent under reduced pressure. The free pyrrolidine acid exhibits a $pK_a$ of 2.6–2.7.

EXAMPLE VII

*Part A.—The reactant cyanothioacetamide*

In a reactor protected from atmospheric moisture with drying tubes and fitted with a gas inlet tube was placed a solution of 66 parts of malononitrile and 15 parts of triethanolamine in about 160 parts of absolute ethanol. Hydrogen sulfide gas was bubbled with stirring into the solution at room temperature until no more yellow solid formed, at which point the reaction temperature had reached 42° C. The reaction mixture was then cooled to 0° C. and the solid product removed by filtration. There was thus obtained 77 parts (77% of theory) of crude cyanothioacetamide melting at 108–110° C. After recrystallization from absolute ethanol, pure cyanothioacetamide was obtained as pale yellow needles melting at 121–123° C. with softening at 119° C.

*Analysis.*—Calc'd for $C_3H_4N_2S$: N, 28.0%; S, 32.0%. Found: N, 27.9%; S, 32.0%.

*Part B.—The monohydrate of 4-cyano-5-thio-2,3-dioxopyrrolidine and the monosodium salt thereof*

To a stirred absolute ethanol solution of sodium ethoxide (20.2 parts of sodium in about 315 parts of absolute ethanol) was added at room temperature 44 parts of the above crystalline cyanothioacetamide (0.50 molar proportion based on the sodium ethoxide) and 68.6 parts of diethyl oxalate (1.07 molar proportions based on the cyanothioacetamide). The reaction mixture solidified in approximately one minute and about 400 parts of absolute ethanol was added to facilitate stirring. The solid crystalline material was removed from the reaction mixture by filtration and after drying, there was thus obtained 55.5 parts (71.5% of theory) of the crude monosodium salt of 4-cyano-5-thio-,2,3-dioxopyrrolidine as a brown amorphous powder. After reprecipitation from hot absolute methanol solution with anhydrous diethyl ether, the pure monosodium salt of 4-cyano-5-thio-2,3-dioxopyrrolidine was obtained as golden brown platelets, readily soluble in water and melting at 243–246°C. with decomposition and charring.

To a solution of two parts of the above monosodium salt in 20 parts of water, aqueous 5% hydrochloric acid was added dropwise with cooling until precipitation was complete. The golden, crystalline solid was removed by filtration and rapidly recrystallized from hot water. After drying at 65° C. there was thus obtained one part of the pure monohydrate of 4-cyano-5-thio-2,3-dioxopyrrolidine as golden platelets melting at 240–250° C. with decomposition.

*Analysis.*—Calc'd for $C_5H_2N_2O_2S.H_2O$: N, 16.3%; S, 18.6%. Found: N, 16.3%; S, 18.8%.

A water solution of the monohydrate exhibited a deep red to purple coloration with ferric chloride solution and formed colored precipitates of the respective metal salts with aqueous solutions of heavy metal ions, e. g., greenblack with $Cu^{++}$, deep red turning to black with $Ag^+$, light yellow with $Hg^{++}$, and deep yellow with $Pb^{++}$.

EXAMPLE VIII

*Monohydrated mono- and disodium salts of 4-acetyl-2,3,5-trioxopyrrolidine*

To a stirred ethanol solution of sodium ethoxide (4.6 parts of sodium in about 80 parts of absolute ethanol) was added at room temperature 10.1 parts (0.50 molar proportion based on the sodium ethoxide) of alpha-acetylacetamide and a solution of 14.6 parts of diethyl oxalate (an equimolar proportion based on the alpha-acetylacetamide) in about 80 parts of absolute ethanol. A yellow solid formed immediately in the reaction mixture as the temperature rose spontaneously from 20 to 35° C. After standing for about 5 minutes, the solid was removed by filtration, washed thoroughly with absolute ethanol, and finally dried in a vacuum oven. There was thus obtained 18.7 parts of mixed mono- and disodium salts of 4-acetyl-2,3,5-trioxopyrrolidine as an amorphous solid. After recrystallization from aqueous 5% hydrochloric acid, the pure monohydrated, monosodium salt of 4-acetyl-2,3,5-trioxopyrrolidine was obtained as a light yellow amorphous powder.

*Analysis.*—Calc'd for $C_6H_4NO_4Na.H_2O$: C, 36.9%; H, 3.1%; N, 7.2%; Na, 11.8%. Found: C, 37.4%, 37.2%; H, 3.3%, 3.1%; N, 7.4%, 7.4%; Na, 12.0%.

EXAMPLE IX

*Part A.—The reactant N,N'-bis(dimethylcyclohexyl)-malonamide*

A solution of 705 parts of mixed dimethylcyclohexylamines (B. P. 40–60° C. under a pressure corresponding to 10 mm. of mercury and $n_D^{25}=1.4520$–$1.4568$ as obtained by the catalytic hydrogenation of technical mixed xylidines) and 444 parts of diethyl malenate in about 850 parts of toluene was heated in a reactor fitted with a distillation column packed with glass helices and a total of 341 parts of the ethyl alcohol/toluene azeotrope was removed by distillation through the column at 76.7° C.–77.0° C. over a period of 18 hours. The residual toluene was then removed by distillation. There was thus obtained 883 parts (99% yield) of N,N'-bis(dimethylcyclohexyl)malonamide as a tan, waxy solid.

*Part B.—The sodium salt of 1-dimethylcyclohexyl-4-(N-dimethylcyclohexylcarbamoyl)-2,3,5-trioxopyrrolidine*

A solution of 132 parts of diethyl oxalate and 291.3 parts (equimolar proportions based on the diethyl oxalate) of the above N,N'-bis(dimethylcyclohexyl)malonamide in about 2400 parts of absolute methanol was heated to reflux with stirring and a solution of sodium methoxide [41.5 parts (two molar proportions based on the oxalate) of metallic sodium in about 400 parts of absolute methanol] was added at once. The reaction mixture was heated at the reflux for 30 minutes, cooled to room temperature, and then poured with stirring into about 4000 parts of water. The resulting precipitate was removed by filtration and washed four times by slurrying in water and filtering each time. After drying in a vacuum oven at 40–60° C., there was thus obtained 323 parts (84.8% of theory) of the sodium salt of 1-dimethylcyclohexyl-4-(N-dimethylcyclohexylcarbamoyl)-2,3,5-trioxopyrrolidine as a fine yellow powder, soluble in petroleum ether, gasoline, benzene, toluene, xylene, carbon tetrachloride, diethyl ether, acetone, and dimethylformamide. The potassium salt hydrate is likewise a yellow amorphous powder and the titanium IV bis salt (the dihydroxide hydrate) is a brown amorphous powder.

A 10-part sample of the above monosodium salt was crushed in a mortar with excess aqueous 10% hydrochloric acid. The resulting reaction mixture was transferred to a flask, heated to steam bath temperatures and subsequently cooled to ice/water bath temperatures. The resulting solid was removed by filtration, washed with distilled water and dried in a vacuum desiccator overnight. There was thus obtained 9.2 parts of the crude 1-dimethylcyclohexyl-4-(N-dimethylcyclohexylcarbamoyl)-2,3,5-trioxopyrrolidine as a yellow solid. After recrystallization from petroleum ether, the pure 1-dimethylcyclohexyl - 4 - (N - dimethylcyclohexylcarbamoyl)-2,3,5-trioxopyrrolidine was obtained as light yellow crystals.

*Analysis.*—Calc'd for $C_{21}H_{32}N_2O_4$: C, 67.0%; H, 8.6%; N, 7.4%. Found: C, 66.8%; H, 8.9%; N, 7.0%, 7.2%.

*Part C.—Other metal salts of 1-dimethylcyclohexyl-4-(N - dimethylcyclohexylcarbamoyl) - 2,3,5 - trioxopyrrolidine: The cobalt salt*

A solution of 25 parts of cobaltous acetate in 200 parts of water was added with stirring at room temperature to a solution of 25 parts of the above sodium salt of 1-dimethylcyclohexyl-4-(N-dimethylcyclohexylcarbamoyl)-2,3,5-trioxopyrrolidine in a blend of about 300 parts of acetone and 150 parts of water. The precipitate which formed immediately was removed by filtration and dried. The crude product was then dissolved in diethyl ether and the resultant solution filtered to remove occluded by-product sodium acetate and excess cobaltous acetate. The diethyl ether was removed from the filtrate by evaporation at room temperature. There was thus obtained as a pale pink, amorphous powder 19.2 parts of the hydrated cobaltous-bis[1-dimethylcyclohexyl-4-(N-dimethylcyclohexylcarbamoyl)-2,3,5-trioxopyrrolidine] salt.

Analysis.—Calc'd for $(C_{21}H_{31}O_4N_2)_2Co.H_2O$: C, 60.9%; H, 7.8%; N, 6.8%; Co, 7.1%. Found: C, 60.9%; H, 7.9%; N, 6.6%; Co, 6.0%.

The data obtained in similar preparations of other organic soluble metal salts of 1-dimethylcyclohexyl-4-(N-dimethylcyclohexylcarbamoyl)-2,3,5-trioxopyrrolidine are summarized in the following table:

TABLE II

| Salt | Formula | | Percent C | Percent H | Percent N | Metal, Percent |
|---|---|---|---|---|---|---|
| Manganous-bis Hydrate | $(C_{21}H_{31}O_4N_2)_2Mn.H_2O$ | Calc'd | 61.2 | 7.8 | 6.8 | Mn, 6.7. |
| | | Found | 61.8 | 7.9 | 6.2 | Mn, 5.5. |
| Nickelous-bis Hydrate | $(C_{21}H_{31}O_4N_2)_2Ni.H_2O$ | Calc'd | 60.9 | 7.8 | 6.8 | Ni, 7.1. |
| | | Found | 60.4 | 7.8 | 6.8 | Ni, 5.6. |
| Cupric-bis Dihydrate | $(C_{21}H_{31}O_4N_2)_2Cu.2H_2O$ | Calc'd | 59.4 | 8.2 | 6.6 | Cu, 7.4. |
| | | Found | 59.3 | 7.7 | 6.4 | Cu, 8.4. |
| Ferric-bis Hydroxide Hydrate | $(C_{21}H_{31}O_4N_2)_2FeOH.H_2O$ | Calc'd | 59.9 | 7.4 | 6.6 | Fe, 6.6. |
| | | Found | 59.7 | 7.6 | 6.4 | Fe, 6.4. |
| Calcium-bis Hydrate | $(C_{21}H_{31}O_4N_2)_2Ca.H_2O$ | Calc'd | | | | Ca, 4.9. |
| | | Found | | | | Ca, 4.0. |

EXAMPLE X

Part A.—The reactant N,N'-didodecylmalonamide

A solution of 16 parts of diethyl malonate and 37 parts of dodecylamine (2 molar proportions based on the diethyl malonate) in 50 parts of benzene was heated at the reflux in a reactor fitted with a fractionation column for a period of three days, during which time a benzene/ethanol azeotrope was slowly formed and removed by distillation through the column. The reaction mixture was then cooled and the resultant solid removed by filtration. After washing with ethanol and drying, there was thus obtained 28.3 parts (58% of theory) of N,N'-didodecylmalonamide as white crystals melting at 118–120° C.

Part B.—1-dodecyl-4-(N-dodecylcarbamoyl)-2,3,5-trioxopyrrolidine

A solution of 3.2 parts of the above N,N'-didodecylmalonamide and 1.02 parts (equimolar proportions based on the malonamide) of diethyl oxalate in about 55 parts of absolute ethanol was added to a hot solution of sodium methoxide [0.23 part of sodium (two molar proportions based on the malonamide) in about 5.5 parts of absolute ethanol] and the reaction mixture heated at the reflux with stirring for five hours. The resultant solid was removed by filtration and subsequently dried. After recrystallization from methanol, the pure sodium 1-dodecyl-4-(N-dodecylcarbamoyl)-2,3,5-trioxopyrrolidine salt was obtained as yellow crystals.

Analysis.—Calc'd for $C_{29}H_{51}O_4N_2Na$: C, 67.5%; H, 10.1%; N, 5.5%. Found: C, 67.9%; H, 10.2%; N, 5.2%.

EXAMPLE XI

1-phenyl-4-acetyl-2,3,5-trioxopyrrolidine and the sodium salt thereof

To a stirred ethanol solution of sodium ethoxide (11.4 parts of metallic sodium in about 215 parts of absolute ethanol) was added 88.6 parts (an equimolar proportion based on the sodium ethoxide) of acetoacetanilide, i. e., N-phenyl-alpha-acetylacetamide, and in one portion at about 35° C. a solution of 74 parts (1.01 molar proportion based on the acetamide) of diethyl oxalate in about 225 parts of absolute ethanol. The reaction mixture was then heated to the reflux and allowed to cool to room temperature. After several days at room temperature, the resultant yellow crystalline precipitate was removed by filtration, washed with absolute ethanol, and dried in a vacuum oven overnight. There was thus obtained 49.5 parts (39.2% of theory) of the crude, monosodium salt of 1-phenyl-4-acetyl-2,3,5-trioxopyrrolidine as a non-homogeneous, yellow crystalline solid.

Similar experiments using two molar proportions of sodium ethoxide per mole of diethyl oxalate and acetoacetanilide resulted in the formation of the crude sodium salt in yields as high as 65% of theory.

A mixture of 10 parts of the above crude, monosodium salt and 200 parts of 5% aqueous hydrochloric acid was heated to 90–100° C. for a few minutes and then cooled in an ice water bath. The resultant solid precipitate was removed by filtration, washed with distilled water, and dried in a vacuum oven overnight. There was thus obtained about 6.4 parts of the crude, free trioxopyrrolidine. After recrystallization from absolute alcohol, the pure 1-phenyl-4-acetyl-2,3,5-trioxopyrrolidine was obtained as a tan crystalline product melting at 170–171° C. with decomposition and exhibiting a $pK_a$ of 2.25 in benzene/ethyl alcohol.

Analysis.—Calc'd for $C_{12}H_9O_4N$: C, 62.3%; H, 3.9%; N, 6.1%. Found: C, 62.5%; H, 4.2%; N, 6.5%, 6.5%.

EXAMPLE XII

1-phenyl-4-(N-phenylcarbamoyl)-2,3,5-trioxopyrrolidine and the disodium salt thereof To a stirred, absolute ethanol solution of sodium ethoxide (17.8 parts of sodium in about 250 parts of absolute ethanol) was added an alcoholic slurry of 98 parts (0.5 molar proportion based on the sodium ethoxide) of malonanilide (i. e., N,N'-diphenylmalonamide—M. P. 223–224° C.) in about 225 parts of absolute ethyl alcohol. To the resultant reaction mixture at 36° C. was added with stirring and in one portion 60 parts (1.05 molar proportion based on the malonamide) of diethyl oxalate in about 12 parts of absolute ethyl alcohol. The temperature of the reaction mixture rose spontaneously to 50° C. within about 2 minutes and the whole mixture solidified to a yellow semi-crystalline mass. The precipitate was removed by filtration, washed with alcohol, and dried in a vacuum oven. There was thus obtained 127 parts (100% of theory) of the monosodium salt of 1-phenyl-4-(N-phenylcarbamoyl)-2,3,5-trioxopyrrolidine as a yellow, amorphous powder. After recrystallization from a 50/50 ethyl alcohol/water mixture and subsequent drying in a vacuum oven overnight, the pure monosodium salt was obtained as a yellow, crystalline solid.

Analysis.—Calc'd for $C_{17}H_{11}O_4N_2Na$: N, 8.5%; Na, 7.0%. Found: N, 8.6%, 8.5%; Na, 7.0%, 7.2%.

A ten-part sample of the crude, monosodium salt was heated to 90–100° C. for a few minutes with 200 parts of 5% aqueous hydrochloric acid. The insoluble material was removed by filtration, washed with distilled water, and dried in a vacuum oven. There was thus obtained 8.1 parts of the crude, free trioxopyrrolidine. After recrystallization from benzene, the pure 1-phenyl-4-(N-phenylcarbamoyl)-2,3,5-trioxopyrrolidine was obtained as bright yellow, needle crystals, melting at 168° C. with decomposition and exhibiting a $pK_a$ of 2.25 in benzene/ethyl alcohol.

*Analysis.*—Calc'd for $C_{17}H_{12}O_4N_2$: C, 66.2%; H, 3.9%; N, 9.1%. Found: C, 66.2%; H, 4.1%; N, 9.6%, 9.4%.

A 2,4-dinitrophenylhydrazone of the pure trioxopyrrolidine was obtained as a dark red, crystalline solid, melting at 230–232° C. with decomposition. The infrared spectrum of the pure trioxopyrrolidine exhibited characteristic absorption bands at $5.6\mu$, $5.8\mu$, and $5.95\mu$ for the trioxopyrrolidine nucleus. The ultraviolet spectrum, obtained on an ethyl alcohol solution of the pure trioxopyrrolidine, exhibited characteristic absorption maxima at 2620 A. and 3580 A., respectively, for the trioxopyrrolidine nucleus and the carbamoyl and substituted carbamoyl functions in the 4-position.

EXAMPLE XIII

*1-cyclohexyl-4-(N-cyclohexylcarbamoyl)-2,3,5-trioxopyrrolidine and its monosodium salt*

A suspension of 38 parts of diethyl oxalate and 67 parts (an equimolar proportion based on the oxalate) of N,N'-dicyclohexylmalonamide in about 250 parts of absolute methanol was added to a solution of sodium methoxide [11.7 parts (two molar proportions based on the oxalate) of metallic sodium in about 150 parts of absolute methanol], and the reaction mixture heated at the reflux for 2.5 hours and then cooled to room temperature. The resulting precipitate was removed by filtration, washed with methanol and dried at 45° C. under reduced pressure. There was thus obtained 80 parts (87.3% of theory) of the crude, monosodium salt of 1-cyclohexyl-4-(N-cyclohexylcarbamoyl)-2,3,5-trioxopyrrolidine as a fine, yellow powder.

A ten-part sample of this product was heated to 90–100° C. for a few minutes with about 50 parts of 10% aqueous hydrochloric acid. The insoluble material was removed by filtration, washed with distilled water and dried in a vacuum desiccator at room temperature. There was thus obtained the crude free trioxopyrrolidine as a yellow, amorphous solid, melting at 185–187° C. After recrystallization from benzene, followed by drying in a vacuum desiccator overnight, the pure 1-cyclohexyl-4-(N-cyclohexylcarbamoyl)-2,3,5-trioxopyrrolidine was obtained as light yellow needle crystals, melting at 188–189° C. with decomposition and exhibiting a $pK_a$ of 3.1 in benzene/ethyl alcohol.

*Analysis.*—Calc'd for $C_{17}H_{24}N_2O_4$: C, 63.7%; H, 7.6%; N, 8.8%. Found: C, 63.8%; H, 7.7%; N, 8.5%, 8.5%.

The ultraviolet absorption curve of an ethyl alcohol solution of the pure, free trioxopyrrolidine exhibited absorption maxima at 2410 A. and 2420 A.

EXAMPLE XIV

*Part A.—The reactant N,N'-bis(3-trifluoromethylphenyl)-malonamide*

A solution of 161.1 parts of 3-trifluoromethylaniline and 81 parts (0.5 molar proportion based on the aniline) of diethyl malonate in about 85 parts of toluene was heated in a reactor fitted with a distillation column packed with glass helices and the alcohol resulting from the reaction removed as the ethyl alcohol/toluene azeotrope boiling at 76.7° C. by distillation through the column over a period of 24 hours. The resultant solid (73.5 parts) was removed by filtration and the filtrate then heated at the reflux for an additional 24 hours. Ethyl alcohol, toluene, and unreacted starting materials were removed from the reaction mixture by heating at 90–100°C. under reduced pressure. There was thus obtained a second crop (96.4 parts) of the white crystalline product. After combination and recrystallization from benzene, there was thus obtained 99.9 parts (51.2% yield) of pure N,N'-bis(3-trifluoromethylphenyl)-malonamide as white needle crystals melting at 160–161° C.

*Analysis.*—Calc'd for $C_{17}H_{12}N_2F_6O_2$: C, 52.3%; H, 3.1%; N, 7.2%; F, 29.2%. Found: C, 52.4%; H, 3.4%; N, 7.4%, 7.3%; F, 29.8, 29.9%.

*Part B.—1-(3-trifluoromethylphenyl)-4-[N-3-trifluoromethylphenyl)carbamoyl]-2,3,5-trioxopyrrolidine and the sodium salt thereof*

A solution of 82 parts of the above N,N'-bis(3-trifluoromethylphenyl)malonamide and 34 parts (1.1 molar proportion based on the malonamide) of diethyl oxalate in about 300 parts of absolute ethanol was added with stirring to a solution of sodium ethoxide (9.7 parts of sodium, two molar proportions based on the malonamide, in about 300 parts of absolute ethanol). The reaction mixture became yellow and after heating to about 40° C. a yellow solid separated. The precipitate was removed by filtration, washed with absolute ethanol and dried in a vacuum oven overnight. There was thus obtained 70 parts (71.5% of theory) of the crude monosodium salt of 1-(3-trifluoromethylphenyl)-4-[N-(3-trifluoromethylphenyl)carbamoyl]-2,3,5-trioxopyrrolidine as a yellow amorphous powder.

A mixture of 10 parts of the above crude, sodium salt and about 50 parts of aqueous 10% hydrochloric acid was heated at 90–100° C. for a few minutes and the insoluble material removed by filtration, washed with distilled water and dried in a vacuum desiccator at room temperature. There was thus obtained 8.7 parts of the crude free trioxopyrrolidine as a light yellow amorphous powder. After recrystallization from a mixture of heptane and benzene, the pure 1-(3-trifluoromethylphenyl)-4-[N-(3-trifluoromethylphenyl)-carbamoyl]-2,3,5-trioxopyrrolidine was obtained as light yellow needle crystals, melting at 145–146° C. and exhibiting a $pK_a$ of 2.05 in benzene/ethyl alcohol.

*Analysis.*—Calc'd for $C_{19}H_{10}N_2F_6O_4$: C, 51.4%; H, 2.3%; N, 6.3%; F, 25.7%. Found: C, 51.1%; H, 2.4%; N, 6.3%, 6.3%; F, 25.7%, 25.8%.

The pure trioxopyrrolidine exhibited in ethyl alcohol solution an ultraviolet absorption spectrum having absorption maxima at 2680 A. and 3580 A., which regions are considered characteristic of, respectively, the trioxopyrrolidine structure and the 4-carbamoyl substituent. A 2,4-dinitrophenylhydrazone of the pure trioxopyrrolidine was obtained as an orange crystalline solid, melting at 205–208° C.

EXAMPLE XV

*Part A.—The reactant 2-methyl-5-isopropylcyclohexylamine*

A mixture of 105.5 parts of 2-nitro-p-cymene, i. e., 2-methyl-5-isopropylnitrobenzene, and 2 parts of ruthenium dioxide catalyst in about 100 parts of 1,4-dioxane was placed in a pressure resistant reaction vessel. The vessel was closed and pressured with hydrogen to about 1000 lb./sq. in. and the temperature increased slowly to effect the reduction of the nitro group, a reaction which is highly exothermic. The reaction mixture was then pressured with hydrogen to about 2500 lb./sq. in. and the temperature increased to about 100° C. to complete the hydrogenation of the aromatic ring. Excess hydrogen pressure was then vented to the atmosphere and the tube cooled, and opened. The contents were filtered through diatomaceous silica to remove the catalyst and the dioxane solvent removed from the filtrate by distillation at 80–100° C. under reduced pressure. The residues from two such runs were combined and fractionated. A heart-cut, boiling at 91–93° C. under a pressure corresponding to 16 mm. of mercury, was taken as the pure product. There was thus obtained 149.5 parts (82% of theory) of 2-methyl-5-isopropylcyclohexylamine as a colorless liquid exhibiting a $n_D^{25}$ of 1.4620.

*Analysis.*—Calc'd for $C_{10}H_{21}N$: C, 77.3%; H, 13.6%; N, 9.0%. Found: C, 77.7%; H, 13.4%; N, 8.6%, 8.7%.

*Part B.*—*The reactant N,N'-bis(2-methyl-5-isopropylcyclohexyl)malonamide*

A mixture of 155.3 parts of the above 2-methyl-5-isopropylcyclohexylamine and 80.1 parts (0.5 molar proportion based on the amine) of diethyl malonate in about 100 parts of toluene was heated at the reflux in a reaction vessel fitted with a distillation column. The ethyl alcohol formed in the reaction was removed through the column as the ethyl alcohol/toluene azeotrope, boiling at 76.7° C.–77.0° C. Toluene and unreacted starting materials were then removed by heating at 80–100° C. under reduced pressure. There was thus obtained 191 parts of crude product as a white, waxy solid. After recrystallization from heptane, the pure N,N'-bis(2-methyl-5-isopropylcyclohexyl)malonamide was obtained as a white, crystalline solid melting at 174–187° C.

*Analysis.*—Calc'd for $C_{23}H_{42}N_2O_2$: C, 73.0%; H, 11.2%; N, 7.4%. Found: C, 73.1%, 72.8%; H, 11.2%, 11.0%; N, 7.3%, 7.2%.

*Part C.*—*1 - (2 - methyl - 5 - isopropylcyclohexyl) - 4 - [N - (2 - methyl - 5 - isopropylcyclohexyl)carbamoyl] - 2,3,5 - trioxopyrrolidine and the sodium salt thereof*

To a stirred solution of sodium ethoxide (19.7 parts of metallic sodium in about 300 parts of absolute ethyl alcohol) was added a solution of 162.5 parts (0.5 molar proportion based on the sodium ethoxide) of the above N,N' - bis(2 - methyl - 5 - isopropylcyclohexyl)malonamide and 65 parts (0.52 molar proportion based on the sodium) of diethyl oxalate in about 225 parts of absolute ethyl alcohol. The reaction mixture which became yellow immediately, was heated at the reflux with stirring for three hours, then cooled to room temperature, and poured with stirring into an excess of cold water. The resultant yellow solid was extracted from the water mixture with diethyl ether and the ether removed from the extract by evaporation at 25–35° C. There was thus obtained 187 parts (96% of theory) of the crude monosodium salt of 1-(2-methyl-5-isopropylcyclohexyl)-4 - [N - (2 - methyl - 5 - isopropylcyclohexyl)carbamoyl]-2,3,5-trioxopyrrolidine as a yellow amorphous powder.

A ten part sample of the crude product was heated at 90–100° C. for a few minutes with about 50 parts of aqueous 10% hydrochloric acid. The insoluble material was removed by filtration, washed with distilled water and dried in a vacuum desiccator. There was obtained 8.5 parts of the crude, free trioxopyrrolidine as a yellow amorphous solid. Upon recrystallization from an 80/20 ethyl alcohol/water mixture, the pure 1 - (2 - methyl - 5 - isopropylcyclohexyl) - 4 - [N - (2-methyl - 5 - isopropylcyclohexyl)carbamoyl] - 2,3,5 - trioxopyrrolidine monohydrate was obtained as yellow crystals melting at 98–102° C.

*Analysis.*—Calc'd for $C_{25}H_{40}N_2O_4 \cdot H_2O$: C, 66.5%; H, 9.3%; N, 6.2%. Found: C, 67.4%; H, 9.1%; N, 6.3%, 6.2%.

The pure trioxopyrrolidine exhibited a characteristic dark red color with alcoholic ferric chloride solution and readily formed a dark red, crystalline 2,4-dinitrophenylhydrazone.

In ethyl alcohol solution the trioxopyrrolidine exhibited an ultraviolet absorption spectrum having absorption maxima at 2380 A. and 3530 A. which are in the ranges characteristic for these compounds.

EXAMPLE XVI

*Part A.*—*The reactant N,N'-hexamethylenebis(alpha-cyanoacetamide*

A solution of 46 parts of hexamethylenediamine in about 46 parts of methyl alcohol was added dropwise with stirring over a period of one hour to 46 parts (2.05 molar proportions based on the diamine) of ethyl cyanoacetate in a glass reactor fitted with a reflux condenser. The reaction mixture was stirred at the reflux for an additional two hours and then allowed to cool to room temperature. The resultant precipitate was removed by filtration, washed with methanol, and finally dried. There was thus obtained 30 parts of crude N,N'-hexamethylenebis(cyanoacetamide) as a pink, amorphous solid. After two recrystallizations from methanol using decolorizing charcoal, there was obtained 8.5 parts of pure N,N'-hexamethylenebis(alpha-cyanoacetamide) as white crystals melting at 149–150° C.

*Analysis.*—Calc'd for $C_{12}H_{18}N_4O_2$: C, 57.6%; H, 7.2%; N, 22.4%. Found: C, 57.6%; H, 7.4%; N, 22.3%, 22.2%.

*Part B.*—*Salts of 1,1'-hexamethylenebis(4-cyano-2,3,5-trioxopyrrolidine)*

To a solution of 21.6 parts of sodium methylate and 9.2 parts of sodium in about 400 parts of absolute ethyl alcohol and 65 parts (0.55 molar proportion based on sodium alkoxide) of diethyl oxalate was added over a period of 15 minutes 50 parts (0.25 molar proportion based on the sodium alkoxide) of the above N,N'-hexamethylenebis(alpha-cyanoacetamide). The reaction mixture became yellow-orange and was heated to the reflux and maintained at this temperature with stirring for six hours. The brown, gummy product which settled to the bottom of the reactor was separated by decanting the rest of the reaction mixture and after a triturating with petroleum ether and subsequent filtration, there was thus obtained 59.3 parts of the crude disodium salt of 1,1' - hexamethylenebis(4 - cyano - 2,3,5 - trioxopyrrolidine) as a light brown powder. An additional 12.9 parts of the crude product was obtained by concentration of the filtrate. The crude product in ethyl alcohol solution exhibits an absorption maxima at 2380 A. and 3440 A. which are in the regions characteristic for the trioxopyrrolidine structure.

To a filtered solution of 4 parts of silver nitrate in 50 parts of water was added a filtered solution of 4 parts (0.42 molar proportion based on the silver nitrate) of the above crude disodium salt in 25 parts of water. The cream-colored solid which precipitated immediately was removed by filtration, washed with water, and dried in a vacuum oven overnight at 80° C. under reduced pressure. There was thus obtained the crude dihydrate disilver salt of 1,1'-hexamethylenebis(4-cyano-2,3,5-trioxopyrrolidine) as a light cream colored, amorphous solid.

*Analysis.*—Calc'd for $C_{16}H_{12}N_4O_6Ag_2 \cdot 2H_2O$: N, 9.2%; Ag, 35.6%. Found: N, 8.4%; Ag, 34.8%.

EXAMPLE XVII

*1-phenyl-4-benzoyl-2,3,5-trioxopyrrolidine*

To a solution of sodium ethoxide (11.5 parts of sodium in about 320 parts of absolute ethanol) was added with stirring at room temperature a solution of 59.8 parts (0.5 molar proportion based on sodium) of benzoylacetanilide and 40.2 parts of diethyl oxalate in about 200 parts of absolute ethanol. The resulting light yellow reaction mixture was heated with stirring for one hour and then allowed to cool to room temperature. After 48 hours at this temperature, the resultant yellow crystals were removed by filtration, washed with absolute ethanol and dried overnight under reduced pressure at 70° C. There was thus obtained 24.5 parts (31.1% of theory) of the crude sodium salt of 1-phenyl-4-benzoyl-2,3,5-trioxopyrrolidine as a yellow crystalline solid. A ten part sample of the crude product was ground in a mortar with 100 parts of 5% aqueous hydrochloric acid and the mixture then heated to steam bath temperature. The cream colored solid was removed by filtration, washed with water and dried overnight under reduced pressure at 80° C. There was thus obtained 7.5 parts (80% of theory) of the crude free acid. Upon recrystallization from benzene, there was obtained 5.8 parts of pure 1-phenyl-4-benzoyl-2,3,5-trioxopyrrolidine as light yellow crystals melting at 183–184° C.

*Analysis.*—Calc'd for $C_{17}H_{11}NO_4$: C, 69.6%; H, 3.8%; N, 4.8%. Found: C, 69.7%; H, 3.8%; N, 5.2%, 5.1%.

This invention is generic to a new class of 2,3,5-trichalcogenpyrrolidines and their salts, especially the metallic salts thereof, carrying in the 4-position a negative, i. e., strong electron attractive, amino-hydrogen-free group which exerts when attached to a benzene nucleus a positive electrostatic polarizing effect on the adjacent carbon to carbon double bond of said benzene nucleus of at least $0.84 \times 10^{-4}$ dynes, i. e., is strongly meta-directing (greater than 50%). The preferred negative groups, because of the availability of the necessary intermediates and their cleaner reaction behavior in the preparation of the products of this invention, are carbacyl groups or precursors thereof which upon hydrolysis are converted to carboxyl with the formation of no additional acidic product of ionization constant greater than $1 \times 10^{-8}$. Specific examples of such groups include the nitrile group; the carbacyl and thiocarbacyl groups, e. g., stearyl, thionoacetyl, and the like; the carboxylic and thiocarboxylic, including dithio-, thiolo- and thionocarboxylic acid groups; the carboxylic and thiocarboxylic acid ester groups, e. g., carbomethoxy(methoxycarbonyl), thionocarboethoxy (ethoxythiocarbonyl), dithiocarbopropoxy (propylthiolothiocarbonyl), thiolocarbododecyloxy (dodecylthiolocarbonyl), and the like; the carbamoyl, thiocarbamoyl groups, and N-mono- and N,N-disubstituted carbamoyl and thiocarbamoyl groups, e. g., N-methylcarbamoyl, N, N-diethylcarbamoyl, N-methylthiocarbamoyl, and the like. The carboxy, thiolo, thiono, and dithiocarboxy and analogous ester and mono- and disubstituted carbamyl and thiocarbamoyl groups will carry as substituents on acyl carbon, ester oxygen, thioloester sulfur, and carboxamide and thiocarboxamide nitrogen, preferably only solely hydrocarbon radicals of no more than eighteen carbons each and more preferably of no more than twelve carbons each, hydrogen not being considered a substituent.

The new 4-functionally substituted 2,3,5-trichalcogenpyrrolidines carry in the 1- or 4-positions at least one hydrogen with the remaining position being occupied by hydrogen or monovalent radicals free of Zerewitinoff active hydrogen which are preferably solely hydrocarbon in nature and more preferably of no more than eighteen carbons each and most preferably of no more than twelve carbons each. Because of the readier availability of the intermediates necessary thereto the 4-functionally substituted 5-thio-2,3-dioxopyrrolidines, and especially the 4-functionally substituted 2,3,5-trioxopyrrolidines, are preferred.

These new compounds can be easily prepared by basic condensation between oxalate and thiooxalate esters, preferably the symmetrical oxalate esters, of the lower primary aliphatic and aromatic monoalcohols, monophenols, monothiols, and monothiophenols, i. e., of up to 7 carbon atoms, particularly the lower dialkyl oxalates, at temperatures in the range 20 to 150° C. and preferably at 25 to 60° C. with the amides of carboxylic and thiocarboxylic acids of at least two carbons, wherein there is a total of at least three hydrogens on the amide nitrogen and the carbon alpha to the carbamoyl or thiocarbamoyl group carrying the said hydrogen-bearing amide nitrogen, and wherein the said alpha-carbon also carries a monovalent negative, i. e., strong electron attractive, amino-hydrogen-free group which exerts when attached to a benzene nucleus a positive electrostatic polarizing effect on the adjacent carbon to carbon double bond of said benzene nucleus of at least $0.84 \times 10^{-4}$ dynes, i. e., is strongly meta-directing (greater than 50%). The most preferred negative functional groups contain multiple atomic linkages therein and are hydrolyzable to carboxyl with the liberation of no additional acidic components of ionization constant greater than $1 \times 10^{-8}$. The negative functional group and the substituent other than hydrogen on the said alpha-carbon will both appear in position 4 of the 2,3,5-trichalcogenpyrrolidine product as discussed previously in detail.

It is to be noted that other oxalic and thio-oxalic acid derivatives than the esters can be similarly used, such as the acid halides, the half ester acid halides, as well as other possible mixed oxalic and thiooxalic acid, ester, and acid halide derivatives. However, because of their much greater reaction efficiency the esters are preferred.

The preferred negatively substituted carboxamides and thiocarboxamides include those wherein the monofunctional negative group in the alpha position is acyl or thioacyl, e. g., carbacyl, carbamoyl, carboxyl, carboxyester or the corresponding sulfur analogs thereof, or a precursor thereto, e. g., cyano, and in any event is hydrolyzable to a carboxylic acid with the formation of no additional acidic products of ionization constant greater than $1 \times 10^{-8}$. Examples of these negatively substituted carboxamides are cyanoacetamide, alpha-carboxyoctanoamide, alpha - carboxypropionamide, N - isohexylmalonamide, N,N-dimethyl-N'-cyclohexylmalonamide, alpha-(N-hexylcarbamoylbutyramide, cyanothioacetamide, alpha-carboethoxythioacetamide, i. e., alpha-ethoxycarbonylthioacetamide, alpha - (N,N-dimethylcarbamoyl)-thioacetamide, alpha-carboxy-alpha-methylthioacetamide, N,N'-p-phenylene-bis(alpha-acetylacetamide), alpha,alpha'-hexamethylenebis(cyanoacetamide), i. e., 2,9-dicyanodecanediamide, and the like.

The various 4-negative functionally substituted 2,3,5-trichalcogenpyrrolidines of this invention, in addition to those discussed in greater detail in the preceding examples, are further illustrated by the following representative compounds which are those obtained by condensation, respectively, of the above listed alpha and N-trihydrogen-bearing, alpha-negatively substituted carboxamides, and thiocarboxamides, with, for instance, diphenyl oxalate or diethyl dithioloxalate: 4-cyano-2,3,5-trioxopyrrolidine; 4-carboxy - 4 - hexyl - 2,3,5 - trioxopyrrolidine; 4 - carboxy-4-methyl-2,3,5-trioxopyrrolidine; 4-carbamoyl-1-isohexyl-2,3,5 - trioxopyrrolidine; 4 - (N,N - dimethylcarbamoyl)-1-cyclohexyl-2,3,5-trioxopyrrolidine; 4-(N-hexylcarbamoyl) - 4 - ethyl - 2,3,5 - trioxopyrrolidine; 4 - cyano - 5-thio-2,3-dioxopyrrolidine, 4-carboethoxy (i. e., 4-ethoxycarbonyl)-5-thio-2,3-dioxopyrrolidine, 4-(N,N-dimethylcarbamoyl) - 5 - thio - 2,3 - dioxopyrrolidine, 4 - carboxy-4-methyl-5-thio-2,3-dioxopyrrolidine, 1,1'-p-phenylenebis-(4-acetyl-2,3,5-trioxopyrrolidine), and 4,4'-hexamethylenebis(4-cyano-2,3,5-trioxopyrrolidine).

The new trichalcogenpyrrolidines are normally obtained in the form of the alkali metal salts. However, for many uses, particularly as pesticides, fungicides, and paint additives, it has proven more effective to use the compounds in the form of their heavier and frequently more active metal salts such as the cupric, ferric, manganese, calcium, cobalt, nickel, barium, lead, or zinc salts, and the like. As illustrated amply in the example, these salts can most conveniently be prepared by simply treating an aqueous solution of the alkali metal salt with an aqueous solution of a water-soluble salt of the heavier metal. As the heavier metal salts are of rather low solubility, the resulting metathetical reaction leads to the direct precipitation of the desired heavier metal salt. The heavier metal salts, especially of the trichalcogenpyrrolidines carrying long chain substituents in both the 1- and 4-positions of six and especially eight or more carbons each exhibit good organic solubility and are of particular utility in quantitative analytical procedures, particularly in such procedures involving the quantitative extraction of metal ions from aqueous solutions into an organic phase. Such salts also find utility as a means of extracting the heavier metals from their ores with organic solvents, e. g., the metal ore would be dissolved in aqueous strong acid and the simple alkali metal salt or the free acid form of the trichalcogenpyrrolidine carrying the long chain substituents would be added and the resultant heavy metal salt of the trichalcogenpyrrolidine preferentially extracted with a non-water miscible organic solvent.

In some uses, such as sequestering agents, metal precipitants, ore extractants, and the like, to avoid contamination with metal ions from the trichalcogenpyrrolidine salts, it has proven desirable to use the new products of this invention in their free form, i. e., non-salt form. The free 4-negatively substituted 2,3,5-trichalcogenpyrrolidines of this invention can be simply and directly prepared by passing solutions of their salts over or through an acid ion exchange resin, most conveniently in column form, and then removing the solvent from the eluent to isolate the free trichalcogenpyrrolidine from the column by elution with water. Another method less convenient but equally operable involves the treatment of a solution, or more usually a suspension, of a heavier metal salt of the trichalcogenpyrrolidines with an equimolar proportion of a suitable chemical reactant to form a less soluble salt of the heavier metal cation. For instance, a solution or suspension of a cupric salt of the trichalcogenpyrrolidines can be treated with hydrogen sulfide, causing precipitation of copper sulfide which is subsequently removed by filtration and the free trichalcogenpyrrolidine recovered by suitable means from the filtrate. The free 4-negatively substituted 2,3,5-trichalcogenpyrrolidine may also be obtained from the sodium salt by solution in ethyl alcohol and addition of dry hydrogen chloride. Removal of sodium chloride and ethyl alcohol yields the free trichalcogenpyrrolidine. In the case of the pyrrolidines having a total of only one hydrogen on the 1- and 4-positions, the free trichalcogenpyrrolidine can be obtained easily by simply treating the salt with an aqueous solution of an acid of pK$_a$ less than 2.

The metal salts of these new 4-negatively substituted 2,3,5-trichalcogenpyrrolidines are generically colored crystalline solids, varying in shade and intensity of color with the particular metal involved. Generally, the heavier metal salts are deeper in shade, but even the alkali and alkaline earth metal salts are yellow to yellow-orange. These new trichalcogenpyrrolidine salts are quite stable chemically, which coupled with their color, makes them particularly useful as pigments and soluble colors for conventional paints, enamels, and other such finishes. In such use, the salts are dispersed, including both homogeneously and heterogeneously, in conventional water- or organic-based paint and finishes vehicles, such as the various alkyd resin compositions, varnishes, paints, and the like. As pigments and colors the metal salts also find utility in imparting desirable color to synthetic resins in various shaped article form, coating compositions for fabrics, plastic sheeting, and the like.

Certain of these metal salts are also especially useful as oxidation catalysts. This is particularly true of the heavier metals, especially those of groups VII and VIII of the periodic table. Particularly outstanding in this use are the cobalt, nickel, and manganese salts. These catalysts accelerate the air oxidation of unsaturated hydrocarbons to hydroperoxides and ultimately ketones, and also serve as efficient catalysts for air or oxygen oxidation of aralkyl hydrocarbons to aromatic carboxylic acids.

The new 4-negatively substituted 2,3,5-trichalcogenpyrrolidines themselves, i. e. in the free acid form, are also generically colored crystalline solids. Although the shades are not as deep nor the colors as intense as those of the metal salts, the free acids are also useful as pigments and soluble colors as given in detail above for the salts.

As many apparently widely different embodiments of this invention may be made without departing from the spirit and scope thereof, it is to be understood that this invention is not limited to the specific embodiments thereof except as defined in the appended claims.

I claim:

1. A compound selected from the class consisting of 4-substituted pyrrolidines and their salts, said 4-substituted pyrrolidine having attached to carbon in each of the 2-, 3-, and 5-positions of the heterocyclic nucleus a chalcogen of atomic number less than 17, having singly and solely covalently bonded to the carbon atom in the 4-position of the heterocyclic nucleus through carbon thereof a group selected from the class consisting of the carboxyl group and groups free from aminohydrogen which upon hydrolysis are converted to carboxyl with the formation of no additional acidic product of ionization constant greater than $1 \times 10^{-8}$, and having hydrogen attached to at least one of the atoms in the 1- and 4-positions of the heterocyclic nucleus, the other of said atoms in the 1- and 4-positions of the heterocyclic nucleus being attached to a member selected from the class consisting of hydrogen and hydrocarbon radicals of 1 to 18 carbon atoms.

2. A 4-substituted pyrrolidine having doubly bonded to carbon in each of the 2-, 3- and 5-positions of the heterocyclic nucleus a chalcogen of atomic number less than 17, having attached to the carbon atom in the 4-position of the heterocyclic nucleus the carbamoyl group, and having hydrogen attached to at least one of the atoms in the 1- and 4-positions of the heterocyclic nucleus.

3. A 4-substituted pyrrolidine having doubly bonded to carbon in each of the 2-, 3-, and 5-positions of the heterocyclic nucleus a chalcogen of atomic number less than 17, having attached to the carbon atom in the 4-position of the heterocyclic nucleus a carbacyl group of no more than 7 carbon atoms, and having hydrogen attached to at least one of the atoms in the 1- and 4-positions of the heterocyclic nucleus.

4. A 4-substituted pyrrolidine having doubly bonded to carbon in each of the 2-, 3-, and 5-positions of the heterocyclic nucleus a chalcogen of atomic number less than 17, having attached to the carbon atom in the 4-position of the heterocyclic nucleus a carboxy-ester group of no more than 8 carbon atoms, and having hydrogen attached to at least one of the atoms in the 1- and 4-positions of the heterocyclic nucleus.

5. A 4-substituted pyrrolidine having oxygen doubly bonded to carbon in each of the 2-, 3- and 5-positions of the heterocyclic nucleus, having singly and solely covalently bonded to the carbon atom in the 4-position of the heterocyclic nucleus through carbon thereof a group free from aminohydrogen which upon hydrolysis is converted to carboxyl with the formation of no additional acidic product of ionization constant greater than $1 \times 10^{-8}$, and having hydrogen attached to at least one of the atoms in the 1- and 4-positions of the heterocyclic nucleus.

6. A salt of a 4-substituted pyrrolidine as set forth in claim 5.

7. A metal salt of a 4-substituted pyrrolidine as set forth in claim 5.

8. A 4-substituted pyrrolidine having oxygen doubly bonded to carbon in each of the 2-, 3- and 5-positions of the heterocyclic nucleus, having attached to the carbon atom in the 4-position of the heterocyclic nucleus the carbamoyl group, and having hydrogen attached to at least one of the atoms in the 1- and 4-positions of the heterocyclic nucleus.

9. 1-dimethylcyclohexyl-4-(N-dimethylcyclohexyl carbamoyl)-2,3,5-trioxopyrrolidine.

10. 4-carbamoyl-2,3,5-trioxopyrrolidine.

11. A 4-substituted pyrrolidine having doubly bonded to carbon in each of the 2-, 3- and 5-positions of the heterocyclic nucleus a chalcogen of atomic number less than 17, having attached to the carbon atom in the 4-position of the heterocyclic nucleus the cyano group, and having hydrogen attached to at least one of the atoms in the 1- and 4-positions of the heterocyclic nucleus.

12. A 4-substituted pyrrolidine represented by the general formula

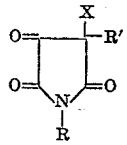

wherein R' is hydrogen, R is a hydrocarbon radical of 1 to 18 carbon atoms, and X is a carboxamide radical wherein the sole substituents on carboxamide nitrogen are from 1 to 2 hydrocarbon radicals each of 1 to 18 carbon atoms.

13. A 4-substituted pyrrolidine having oxygen doubly bonded to carbon in each of the 2-, 3-, and 5-positions of the heterocyclic nucleus, having attached to the carbon atom in the 4-position of the heterocyclic nucleus the cyano group, and having hydrogen attached to at least one of the atoms in the 1- and 4-positions of the heterocyclic nucleus.

14. 4-cyano-2,3,5-trioxopyrrolidine.

15. A 4-substituted pyrrolidine having oxygen doubly bonded to carbon in each of the 2-, 3-, and 5-positions of the heterocyclic nucleus, having attached to the carbon atom in the 4-position of the heterocyclic nucleus a carbacyl group of not more than 7 carbon atoms, and having hydrogen attached to at least one of the atoms in the 1- and 4-positions of the heterocyclic nucleus.

16. 4-acetyl-2,3,5-trioxopyrrolidine.

17. A 4-substituted pyrrolidine having oxygen doubly bonded to carbon in each of the 2-, 3-, and 5-positions of the heterocyclic nucleus, having attached to the carbon atom in the 4-position of the heterocyclic nucleus a carboxy-ester group of not more than 8 carbon atoms, and having hydrogen attached to at least one of the atoms in the 1- and 4-positions of the heterocyclic nucleus.

18. 4-carboethoxy-2,3,5-trioxopyrrolidine.

19. A process for preparing a 4-substituted pyrrolidine which comprises condensing, under anhydrous conditions in a normally liquid, unreactive organic reaction medium containing in solution a strong base of the Claisen condensation type, a diester having the formula

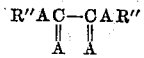

wherein each A is a chalcogen of atomic number less than 17 and each R" is a hydrocarbon radical of no more than 7 carbon atoms with an amide having the structural formula

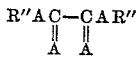

wherein $n$ is an integer from 1 to 2, A is a chalcogen of atomic number less than 17, R and R' are selected from the class consisting of hydrogen, monovalent hydrocarbon radicals of 1 to 18 carbon atoms, and divalent hydrocarbon radicals of 1 to 18 carbon atoms, at least one of R and R' is hydrogen, and X is a substituent selected from the class consisting of the carboxyl group and groups free from amino-hydrogen which upon hydrolysis are converted to carboxyl with the formation of no additional acidic product of ionization constant greater than $1 \times 10^{-8}$, said substituent X being singly and solely covalently bonded through carbon thereof to the alpha carbon atom of said amide.

20. A process for preparing a 4-substituted pyrrolidine which comprises condensing, under anhydrous conditions in an alkyl alcohol reaction medium containing in solution a strong base of the Claisen condensation type, a diester having the formula

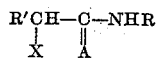

wherein each A is a chalcogen of atomic number less than 17 and each R" is a hydrocarbon radical of no more than 7 carbon atoms with an amide having the structural formula

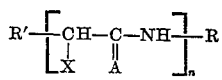

wherein A is a chalcogen of atomic number less than 17, both R and R' are hydrogen, and X is a group free from amino-hydrogen which upon hydrolysis is converted to carboxyl with the formation of no additional acidic product of ionization constant greater than $1 \times 10^{-8}$, said group X being singly and solely covalently bonded through carbon thereof to the alpha carbon atom of said amide.

21. A process for preparing a 4-substituted pyrrolidine which comprises condensing, under anhydrous conditions in an alkyl alcohol reaction medium containing in solution a strong base of the Claisen condensation type, a diester having the formula

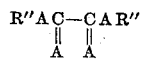

wherein each A is a chalcogen of atomic number less than 17 and each R" is a hydrocarbon radical of no more than 7 carbon atoms with an amide having the structural formula

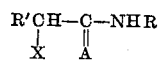

wherein A is a chalcogen of atomic number less than 17, at least one of R and R' is hydrogen and the other is a hydrocarbon radical of 1 to 18 carbon atoms, and X is a group free from amino-hydrogen which upon hydrolysis is converted to carboxyl with the formation of no additional acidic product of ionization constant greater than $1 \times 10^{-8}$, said group X being singly and solely covalently bonded through carbon thereof to the alpha carbon atom of said amide.

22. A process for preparing a 4-substituted pyrrolidine which comprises condensing, under anhydrous conditions in an alkyl alcohol reaction medium containing in solution a strong base of the Claisen condensation type, a diester having the formula

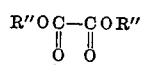

wherein each R" is a hydrocarbon radical of no more than 7 carbon atoms with an amide having the structural formula

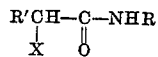

wherein at least one of R and R' is hydrogen and the other is a hydrocarbon radical of 1 to 18 carbon atoms, and X is a group free from amino-hydrogen which upon hydrolysis is converted to carboxyl with the formation of no additional acidic product of ionization constant greater than $1 \times 10^{-8}$, said group X being singly and solely covalently bonded through carbon thereof to the alpha carbon of said amide.

23. A process for preparing a 4-substituted pyrrolidine which comprises condensing, under anhydrous conditions in an alkyl alcohol reaction medium containing in solution a strong base of the Claisen condensation type, a diester having the formula

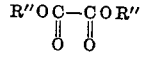

wherein each R" is a hydrocarbon radical of no more than 7 carbon atoms with an amide having the structural formula

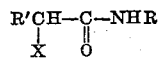

wherein both R and R' are hydrogen, and X is a group free from amino-hydrogen which upon hydrolysis is converted to carboxyl with the formation of no additional acidic product of ionization constant greater than $1 \times 10^{-8}$, said group X being singly and solely covalently bonded through carbon thereof to the alpha carbon of said amide.

24. A process for preparing a 4-substituted pyrrolidine which comprises condensing, under anhydrous conditions in an alkyl alcohol reaction medium containing in solution a strong base of the Claisen condensation type, a diester having the formula

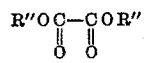

wherein each R'' is a hydrocarbon radical of no more than 7 carbon atoms with an amide having the structural formula

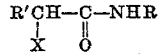

wherein R' is hydrogen, R is a hydrocarbon radical of 1 to 18 carbon atoms, and X is a carboxamide radical wherein the sole substituents on carboxamide nitrogen are from 1 to 2 hydrocarbon radicals each of 1 to 18 carbon atoms.

25. A process for preparing 1-dimethylcyclohexyl-4-(N - dimethylcyclohexylcarbamoyl) - 2,3,5 - trioxopyrrolidine which comprises condensing, under anhydrous conditions in an alkyl alcohol reaction medium containing in solution a strong base of the Claisen condensation type, a lower dialkyl oxalate with N,N'-bis(dimethylcyclohexyl)malonamide.

26. A process for preparing 4-carbamoyl-2,3,5-trioxopyrrolidine which comprises condensing, under anhydrous conditions in an alkyl alcohol reaction medium containing in solution a strong base of the Claisen condensation type, a lower dialkyl oxalate with malonamide.

27. A process for preparing 4-cyano-2,3,5-trioxopyrrolidine which comprises condensing, under anhydrous conditions in an alkyl alcohol reaction medium containing in solution a strong base of the Claisen condensation type, a lower dialkyl oxalate with cyanoacetamide.

References Cited in the file of this patent

Jour. Am. Chem. Soc., vol. 72, pages 5569–5573 (1950).

Jour. Am. Chem. Soc., vol. 73, pages 2230–2233 (1951).

Chem. Abstracts, vol. 5, pages 3256–3257 (1911).